(12) United States Patent
Connell et al.

(10) Patent No.: US 8,019,807 B2
(45) Date of Patent: Sep. 13, 2011

(54) METHOD AND SYSTEM FOR COMMUNICATION BETWEEN COMPUTER SYSTEMS

(75) Inventors: Brian Connell, Dundrum (IE); Paul Acton, Dun Laoghaire (IE)

(73) Assignee: Wireless Enterprise Solutions Technology Limited, Dublin (IE)

( * ) Notice: Subject to any disclaimer, the term of this patent is extended or adjusted under 35 U.S.C. 154(b) by 1405 days.

(21) Appl. No.: 10/121,788

(22) Filed: Apr. 11, 2002

(65) Prior Publication Data

US 2003/0074401 A1    Apr. 17, 2003

(30) Foreign Application Priority Data

May 23, 2001    (IE) .................................. S2001/0493

(51) Int. Cl.
    *G06F 15/16*    (2006.01)
(52) U.S. Cl. ........................ 709/203; 709/202
(58) Field of Classification Search .......... 709/200–203, 709/217–219, 223, 227
    See application file for complete search history.

(56) References Cited

U.S. PATENT DOCUMENTS

| | | | |
|---|---|---|---|
| 5,136,712 A | 8/1992 | Perazzoli, Jr. et al. | 395/700 |
| 5,206,951 A | 4/1993 | Khoyi et al. | 395/650 |
| 5,303,379 A | 4/1994 | Khoyi et al. | 395/700 |
| 5,329,619 A | 7/1994 | Page et al. | 395/200 |
| 5,440,744 A | 8/1995 | Jacobson et al. | 395/650 |
| 5,475,817 A | 12/1995 | Waldo et al. | 395/650 |
| 5,619,710 A | 4/1997 | Travis, Jr. et al. | 395/800 |
| 5,754,772 A | 5/1998 | Leaf | 395/200.33 |
| 5,761,499 A | 6/1998 | Sonderegger | 395/610 |
| 5,812,768 A * | 9/1998 | Page et al. | 709/228 |
| 5,870,605 A | 2/1999 | Bracho et al. | 395/682 |
| 5,893,911 A | 4/1999 | Piskiel et al. | 707/10 |
| 5,946,694 A | 8/1999 | Copeland et al. | 707/103 |
| 6,070,191 A * | 5/2000 | Narendran et al. | 709/226 |
| 6,256,676 B1 * | 7/2001 | Taylor et al. | 709/246 |

(Continued)

FOREIGN PATENT DOCUMENTS

| | | |
|---|---|---|
| DE | 19842673 A1 | 7/1994 |
| WO | WO 00/77653 A | 12/2000 |

OTHER PUBLICATIONS

Microsoft Computer Dictionary, Microsoft Press, Fifth Edition, Page No. 192,264,456,487,576.*

(Continued)

*Primary Examiner* — Faruk Hamza
(74) *Attorney, Agent, or Firm* — Baker Donelson Bearman Caldwell & Berkowitz PC (57) ABSTRACT

A system for brokering business service requests in a computer network is disclosed. The system is operative to receive a request for information from a requester, transmit the request to a provider, and return a response to the requester. The broker typically comprises the following components. A requester-side processing stage operative to communicate with the requester; a provider-side processing stage operative to communicate with the provider; and a broking stage operative to exchange data between the requester-side processing stage and the provider-side processing stage. In operation of the business service broker, upon receipt of a request for a requester, the broking stage obtains data required to respond to the request by communicating with a provider through the provider-side processing stage. The brokering stage formulates a response and returns it to the requester through the requester-side processing stage. The mechanism by which the response is obtained is abstracted from the requester.

24 Claims, 4 Drawing Sheets

U.S. PATENT DOCUMENTS

| | | | | |
|---|---|---|---|---|
| 6,311,269 | B2 | 10/2001 | Luckenbaugh et al. | 713/154 |
| 6,327,622 | B1* | 12/2001 | Jindal et al. | 709/228 |
| 6,347,342 | B1 | 2/2002 | Marcos et al. | 709/315 |
| 6,356,930 | B2 | 3/2002 | Garg | 709/201 |
| 6,389,462 | B1* | 5/2002 | Cohen et al. | 709/218 |
| 6,405,254 | B1 | 6/2002 | Hadland | 709/230 |
| 6,442,611 | B1 | 8/2002 | Navarre et al. | 709/227 |
| 6,510,429 | B1 | 1/2003 | Todd | 707/10 |
| 6,643,661 | B2* | 11/2003 | Polizzi et al. | 707/100 |
| 6,697,836 | B1 | 2/2004 | Kawano et al. | |
| 6,738,975 | B1* | 5/2004 | Yee et al. | 719/310 |
| 6,775,680 | B2* | 8/2004 | Ehrman et al. | 707/102 |
| 6,839,748 | B1* | 1/2005 | Allavarpu et al. | 709/223 |
| 6,842,771 | B2* | 1/2005 | Lansio et al. | 709/203 |
| 6,874,146 | B1* | 3/2005 | Iyengar | 719/313 |
| 6,907,406 | B2* | 6/2005 | Suzuki | 705/52 |
| 6,934,756 | B2* | 8/2005 | Maes | 709/227 |
| 2002/0143819 | A1 | 10/2002 | Han et al. | 707/513 |
| 2003/0018766 | A1 | 1/2003 | Duvvuru | 709/223 |
| 2003/0061404 | A1 | 3/2003 | Atwal et al. | 709/328 |
| 2003/0074485 | A1 | 4/2003 | Zhdankin et al. | 709/316 |
| 2003/0093672 | A1 | 5/2003 | Cichowlas | 713/168 |
| 2003/0097464 | A1 | 5/2003 | Martinez et al. | 709/238 |

OTHER PUBLICATIONS

Karl Gottschalk: "Web Services architecture overview" www-106.IBM.com; Sep. 1, 2000; XP002301412; from http://www-106.ibm.com/develpoerworks/webservices/library/w-ovr/.

Dave Fisco: "IBM's Web Services architecture debuts" www-106.ibm.com, Sep. 1, 2000; pp. 1-8, XP002301413 from http://www-106.ibm.com/developerworks/webservices/library/w-int.html?dwzone=webservices.

Nodine M. et al.: "Semantic brokering over dynamic heterogeneous data sources in InfoSleuth<TM>"; Mar. 23, 1999, Data Engineering, 1999. Proceedings., 15th International conference on Sydney, NSW, Australia Mar. 23-26, 1999, Los Alamitos, CA, USA, IEEE Comput. Soc, US, pp. 358-365, XP010326167 ISBN: 0-7695-0071-4.

Vasudevan Venu: "A web services primer", Apr. 4, 2001, XP002953921.

W3C: "W3C Web Services Workshop, Apr. 11-12, 2001"; www.w3.org, Apr. 30, 2001, XP002301414, from: http://www.w3.org/2001/03/wsws-program.

EPO search report, EP02394064 (Jul. 13, 2005).

Software Engineering Institute, "Client/Server Software Architecture—An Overview", www.sei.cmu.edu/str/descritions/cleintserver_body.html (Aug. 1997).

EPO Office Action; Application No. 02 394 064.6; 3 pages; Feb. 25, 2008.

Decision in EPO 02 394 064.6-2221 ("Service Request Broking System"); Oct. 26, 2010.

Written Statement and amended claims in Appeal of Decision dated Oct. 26, 2010 in EPO 02 394 064.6-2221 ("Service Request Broking System"); Mar. 7, 2011.

* cited by examiner

METHOD AND SYSTEM FOR COMMUNICATION BETWEEN COMPUTER SYSTEMS

BACKGROUND TO THE INVENTION

1. Field of the Invention

This invention relates to a method and system for communication between computer systems. In particular, it relates to a method and system for communication between heterogeneous computer systems interconnected in a computer network. The invention has particular, but not exclusive, application to enterprise application integration "EAI" software and Web Services. More particularly to a system and method for the integration of heterogeneous computer systems' components into a service broker system which simplifies application connection between different types of application programs and interfaces within the application programs, typically at enterprise level or wider.

2. Description of the Prior Art

The success of many businesses depends upon having an ability to adapt to rapid change. Many businesses have benefited from developing a sophisticated information technology (IT) infrastructure with enterprise resource planning (ERP) systems, customer relationship management (CRM) systems, and lately by embracing eCommerce in order to develop new channels to customers. Many enterprises depend on IT to accelerate business change and implement new strategies to meet new opportunities. This places a lot of pressures on the IT infrastructure of a business, both to rapidly assimilate new applications and technologies, and to reuse existing applications and business processes in new ways. As a result of IT systems having been implemented as and when required to address particular needs, many companies have islands of heterogeneous IT systems. Despite their disparate nature, in order to operate effectively, these IT systems must operate and function together as seamlessly as possible, in many cases, with the need to access a pool of data that is common to the whole enterprise. Therefore, a large enterprise typically has a complex portfolio of systems that are difficult to manage effectively.

It is a general requirement in any computer installation, from a single desktop computer to an enterprise-wide network of computers that applications within the installation can communicate with one another. Applications typically share information, applications and/or services.

A conventional approach to establishing communication between application works by relying on each application using a specific agreed mechanism, such as for example a communications protocol or a database format. A particular disadvantage of this arrangement occurs when a new application is introduced into the installation. Either the new application must be configured to use the existing protocol, or the existing applications must be adapted to use a new protocol. In practice, there are many situations in which neither of these approaches is practicable, both are likely to be time-consuming and may introduce errors or incompatibilities into the installation.

Many proposals have been made with an aim of reducing incompatibilities between applications in a computer installation. For example, ODBC database connectivity allows an application to connect to a database using a common interface, irrespective of the actual structure of the database files. If a new database is introduced into the installation, an existing application can communicate with it, provided a suitable ODBC driver is available. However, an application must have knowledge of the logical structure of a database to access it using ODBC.

The emergence of EAI allows IT managers to address some of these issues. EAI solutions offer a simple (but proprietary) way to describe a mechanism to integrate applications effectively with each other. These solutions allow various applications to integrate technically in order to share business logic and data, whereby older applications that are still of value to the business are able to integrate with newer applications. EAI is an important strategy for many companies, but there are many differing types of integration, each addressing slightly different needs. However, as the Internet has evolved over recent years, emerging technologies have moved the focus away from key bespoke product offerings to interchangeable vendor solutions, with the aim of providing increased flexibility. In particular, "web services" has emerged as a set of standards to aid interoperability between disparate systems that will increasingly form a part of a company's EAI strategy.

Yet none of these known systems provide a business with a system and method of delivering one high-level integration interface to application components to permit access to some or all middleware services and some or all back-end systems, since each application must have a coded understanding of the logical layout of the data and services that it is accessing, even if their physical nature is abstracted from the application.

SUMMARY OF THE INVENTION

An aim of this invention is to provide a further level of abstraction of business services, whereby a service requester can be isolated, to a great extent, from both the physical and the logical interface or structure of a provider. As far as possible, the aim is removal of any requirements for the computer requestor and provider applications to have particular programming and/or operational technologies in common with each other. The broker handles the task of identifying, locating and communicating with the providers.

This is achieved by providing a broker that can act as a virtual endpoint for the provision of services to a requestor. In this context, a "service" provides functionality to a requester where the requester knows only what is required, without necessarily having any knowledge of how or where the functionality to provide the service can be achieved. For example, the service may provide a requester with information in a response. In this context, the requester identifies the service and not the source of the information. Likewise, the service may perform an action on behalf of the requester. In this context, the requester identifies the action to be performed, yet need have no information on how or where that action can be performed.

More specifically, from a first aspect, this invention provides a service request broking system operative in a computer system to receive a request for a service from a requester and to transmit the request to a provider; a requester-side processing stage operative to communicate with the requester; a provider-side processing stage operative to communicate with the provider; and a broking stage operative to process the service request, the service request independent of the requester providing an identification of the provider; wherein upon receipt of a service request from a requester, the broking stage is operative to identify a provider to process the request, and to send a request to the provider through the provider-side processing stage.

Thus, the broking system appears to the requester as a virtual provider, being responsive to queries directed to it. These queries describe the service that the requester requires rather than describing the provider, as would happen in a conventional system. The broking system can completely abstract the actual providers that handle the request, therefore the requestor has no need to have any knowledge of the location or identity of the provider.

Typical embodiments of the invention are intended to broker business services. That is to say, services that relate to the operation of a business, typically at a high conceptual level.

The performance of many services involves providing the requester with a response, for example in the form of a piece of information or a confirmation. Therefore, the broking stage may be further operative, when handling such services, to obtain data required to respond to the requester by communicating with a provider through the provider-side processing stage. In such cases, the broking stage can be operative to formulate and return a response to the requester through the requester-side processing stage.

The requester-side processing stage may communicate with the requester using a requester-side protocol. The protocol used is typically chosen to meet the operating requirements of the requester. Likewise, the provider-side processing stage typically communicates with the provider using a provider-side protocol. The requester-side protocol and the provider-side protocol may be identical or dissimilar to each other.

The service broker system and method delivers one high-level interface to each participating component through which the requesters can request services from service providers. This may be termed the "integrate once" approach, which reduces dependence on any proprietary system. The service broker improves the performance of the integration by prioritising according to business-driven priorities, and not by technical optimisations only.

Typical embodiments of the invention further comprise a data store that contains information about one or more providers in which the broking stage is operative to refer to the data store to determine parameters for processing the service request. For example, the data store may contain data that identifies the provider or providers that can respond to the request. Alternatively or additionally, the data store may contain data that relates to individual requestors and the services that the requesters can access. Moreover, the data store may contain data relating to conditions that affect provision of services. As an example, a small subset of such conditions are different times of day, different costs depending on response time, and different costs depending on the service being delivered. The data store may be located locally with the broker stage or remote from it.

In preferred embodiments, the broking stage is operative to validate the service request prior to requesting information from a provider. The validation may include verification that the request is validly formulated for the requester-side processing stage. Validation may include verification that the requester is entitled to make the request. This may be based on commercial or security considerations.

In a typical request broking system embodying the invention, the request is delivered to the broking system over a computer network. For example, the request may be transmitted in accordance with a protocol including one or more of SOAP, IIOP and RMI. Likewise, where a response is received, it may be in accordance with one of these protocols. Available provider interfaces and capabilities may conveniently be defined using a suitable description language such as CORBA Interface Description Language (IDL) or Web Services Description Language (WSDL). The service request may be encrypted.

The system is advantageously configured such that the request can be expressed in terms that are independent of the logical or physical structure of the data on the provider. This allows for a high degree of independence between the addresses and capabilities of the providers, thereby minimising reconfiguration of the requesters in the event that the providers are changed.

The system may operate within a computer installation that includes computers that run a variety of different operating systems.

From a second aspect, this invention provides a method of routing requests and responses between a plurality of computer applications in a computer installation comprising the steps of sending a service request by a requester to a broking system, the request being made in accordance with a requester-side protocol and a broker interface definition independent of the requester providing an identification of a provider of the requested service; analyzing the service request by the broking system to determine which provider or providers can process the service request; and for the or each provider, formulating by the broking system a provider request and sending the provider request to the corresponding provider, the request being encoded in a provider-side protocol.

In handling a service request to which a response is required, having sent the request to the (or each) provider, the broking system may await a response from the provider and upon receipt of a response (and potentially based on the response) provides a response to the requester.

The broking system preferably determines which provider or providers can handle the request depending upon the service that is being requested, the identity of the requester, and the business rules associated with the delivery of the requested service to the requester. Therefore, the service request need only identify the service that is required by the requester; the appropriate provider or providers can be identified by the broking system.

From a third aspect, this invention provides a business service broker system operative in a computer system, comprising: a data store, that contains service descriptions and a configuration repository that relates these to service requestor and service provider functionality; and a computer device for processing service requests from at least one service requester, comprising: a hub for communication protocol handling to the service requestor and to at least one service provider; a service brokering object that receives a service request from a service requestor and extracts data from the data store relevant to the service request based on the service requestor functionality and packages a response to the service request for communication to the service requester, the service request independent of the service requester providing an identification of the service provider of the requested service; a broker management object interacts with the data store to select a service provider based on service provider functionality and packages the service request for communication to the selected service provider and receives a response from the service provider; an administration object that provides the control management of the business service broker system; a requestor gateway object that communicates with requesters; and a provider gateway object that communicates with the providers.

Embodiments of the invention address enterprise-wide system requirements for business service integration by allowing applications to communicate at a business level.

This enables underlying technical language to reflect business logic in service form. These business services may be integrated within and across an enterprise's applications and the integration approach at the business process level makes it easier to rapidly create and deploy new applications and services.

DESCRIPTION OF THE EMBODIMENTS OF THE INVENTION

Embodiments of the invention will now be described in detail, by way of example, and with reference to the accompanying drawings.

As will be understood hereafter, the preferred embodiments of the present invention relate to processes and apparatus for passing instructions and/or requests from one computer application to another in the form of a business service request, substantially removing any requirements for the participating requestor and provider to have programming or operating technologies, communications protocols, programming languages, computer or application platform, information relating to the location of each application, or storage and retrieval mechanisms, in common.

A small sample of the types of business service request that may be handled by a broker embodying the invention include:
  Getting a stock quote—a service that returns the current price of a given stock.
  Current package location—a service that returns the geographical location of a package being handled by a courier.
  Convert currency—a service that performs currency conversions using company rates.
  Get vacancy—a service that returns the nearest hotel that has a vacancy.

Figure 1:
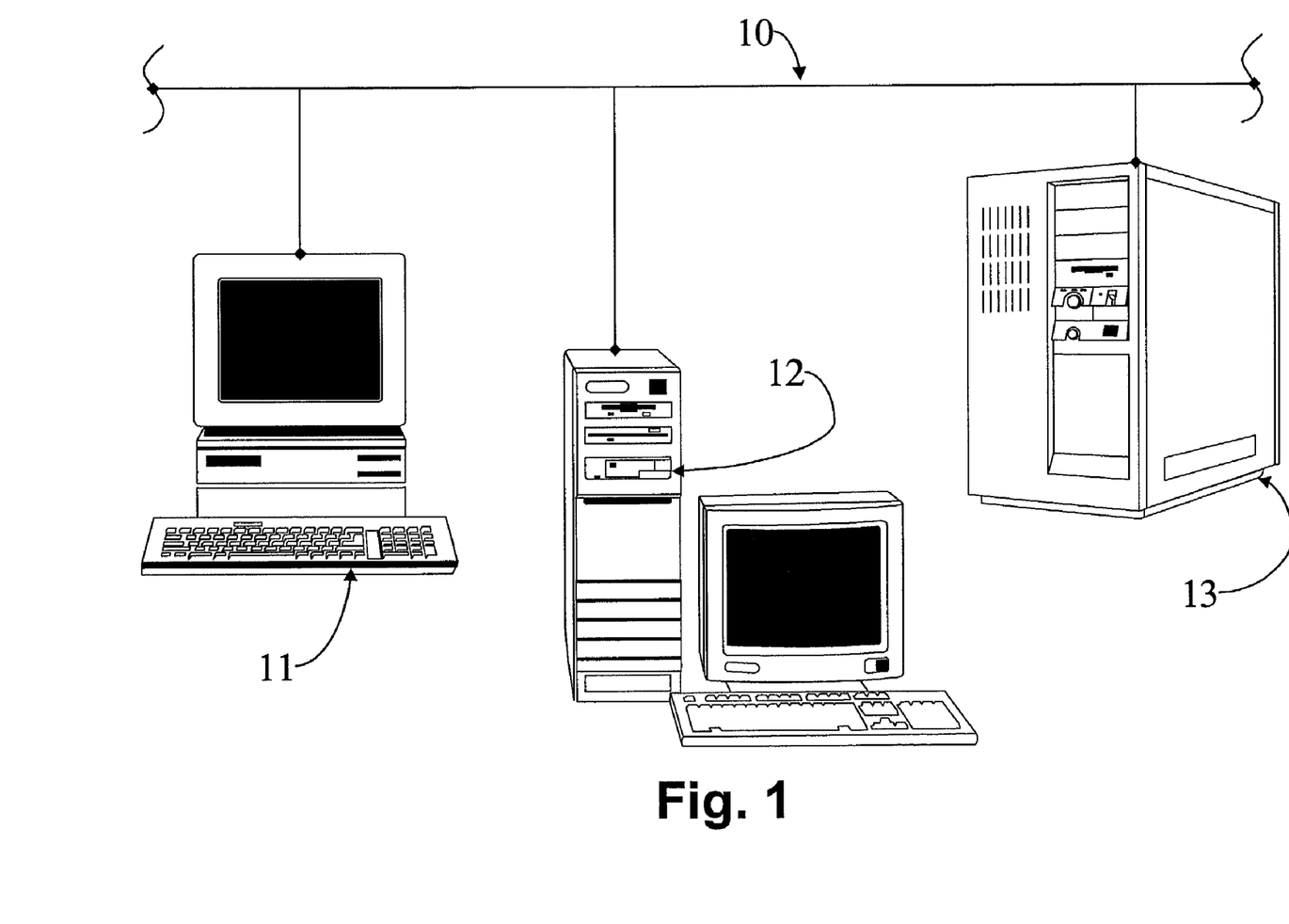
FIG. 1 is a schematic illustration of a computer system suitable for use with the present invention.

FIG. 1 illustrates an exemplary computer installation that includes a network within which an embodiment can be implemented. A first computer 11 is provided in the form of a service requestor, a second computer 12 is provided in the form of a service broker, and a third computer 13 is provided in the form of a service provider. These computers are interconnected by a network 10, which can be provided as a single physical network. Alternatively, the network 10 may be implemented as separate physical networks where a first network connects the service requester 11 with the business service broker 12 and a second network connects the business service broker 12 with the service provider 13. As will be apparent, there are many types and configurations of network that are suitable for use in embodiments of the invention.

Figure 2:
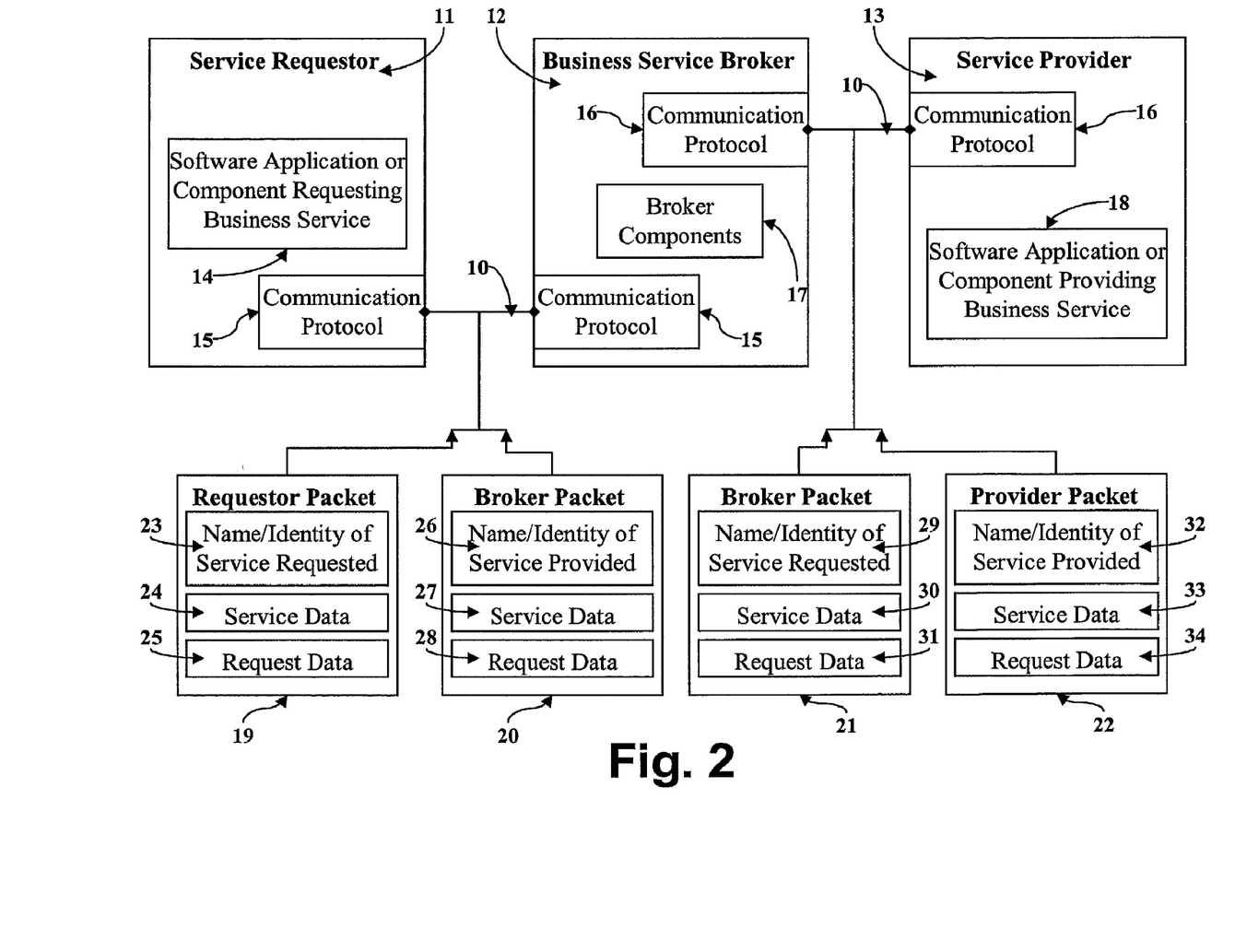
FIG. 2 is a schematic illustration of the preferred embodiment of the computer systems of FIG. 1.

Referring to FIG. 2, a service requestor 11 may be any application being executed on any type of device that makes a request for a particular service, or a particular category or class of service. The service requestor consists of one or more components 14 that request the service using a specific requester-side communication protocol 15. The requester-side protocol 15 may be decided upon at the time of the request, and may even differ between requests. This communication may be formatted and delivered according to protocols such as SOAP, IIOP, or RMI for example. The protocol delivers data over a physical network 10 the service request in the form of packets of data 19 from the service requestor 11 to the service broker 12 and transmits the service response in the form of packets 20 from the service broker 12 to the service requestor 11. Optionally, the packets 19 are encrypted, for example, by way of public key encryption.

The requesting packet 19 includes the name of the service being requested 23 as well as data relating to the proper administration of the service request itself 24. The service data 24 may include elements such as the identity of the service request, service contract details, authentication information, and encoding information. This data may contain many different elements and combinations as are required to implement the specific request. The request data 25 includes information directly related to the service request, such as parameters required, that must be passed directly to the service provider.

Code to construct an example requesting packet 19 is presented in Listing 1, below. The entire data set corresponds to FIG. 2, element 19. This is the data corresponding to the service request sent by the Requester to the Business Service Broker. The <schema targetNamespace . . . > element corresponds to FIG. 2, element 23. This is the Name/Identity of the Service Requested. The element <BSBRequestInformation> corresponds to FIG. 2, element 24. This is data specific to the administration of the fulfillment of the service. The elements <CustomerSSN="213432423432"> and <CustomerDetails> correspond to FIG. 2, element 25. This is the information specific to this service request, and usually includes information that must be passed to the service provider.

---

Listing 1: Request from Requestor to Business Service Broker

```
<?xml version="1.0" encoding="UTP-8"?>
<schema targetNamespace="http://www.Westglobal.com/CreditCheck"
        xmlns:xml="http://www.w3.org/XML/1998/namespace"
        xmlns="http://www.w3.org/2000/10/XMLSchema"
        version="1.0">
<BSBRequestInformation>
        <RequestorID="App12800">
        <Security="B%(8390P+J4$!">
        <RequestID="000911288211">
        <RequestedService="CreditCheck">
</BSBRequestInformation>
<CustomerSSN="213432423432">
<CustomerDetails>
    <name="Joe Bloggs">
    <Address>
            <address1="15 Oceanview Terrace">
            <address2="Oceania Avenue">
            <address3="Oceanton Place">
            <address4="The Ocean">
            <home phone="111222333444">
            <work phone="444333222111">
    </Address>
    <DateOfBirth="23/04/1967">
    <Occupation="Personal Trainer">
</CustomerDetails>
```

---

The service broker 12 may include any number of components 17 that may exist in a number of different combinations and configurations, either executing in a distributed or a non-distributed fashion. These collaborate to provide the correct delivery of services from a service provider to the service requestor. The service broker 12 contains components that communicate with service requesters 15 and service providers 16 using specific communication protocols and technologies, as well as components for brokering the services on behalf of the service providers, and components for managing the business service broker itself. A distributed architecture is, of course, only one type of architecture suitable for computer applications, and a variety of other configurations, such as client/server, can also be used.

The service broker 12 sends service requests to an appropriate service provider 13 that has the ability to fulfil the service request initially received by a service provider 11. The service broker 12 communicates the request using a provider-side communication protocol 16 that corresponds to the protocol in use by the specific service provider that will fulfil the service request.

The requester-side protocol and the provider-side protocol may or may not be the same protocol. The protocols are selected to ensure that the service broker 12 can communicate with the requester and provider using protocols that are understood by these systems.

This communication may be formatted and delivered according to protocols such as SOAP, IIOP, or RMI for example. The protocol delivers over a physical network 10 the service request in the form of packets of data 21 from the service broker 12 to the service requestor 13 and transmits the service response in the form of packets 22 from the service provider 13 to the service broker 12.

A service request packet 21 is formatted similarly to the original requestor packet 19 and includes the name of the service being requested 29 as well as data relating to the administration of the service request itself 30. The service data 30 may consist of elements such as the identity of the service request, service contract details, authentication information, and encoding information. This data may contain many different elements and combinations. The request data 31 includes information directly related to the service request, such as parameters required that must be passed directly to the service provider.

Listing 2, below, shows an example of code to construct a service request packet 21. The entire data set corresponds to FIG. 2, element 21. This is the data corresponding to the service request sent by the service broker to the service provider. The element targetNamespace corresponds to FIG. 2, element 29. This is the Name/Identity of the Service Requested. The element <Auth="2kJk*^kj)44000"> corresponds to FIG. 2, element 30. This is the service provider specific data that tells the service provider how to deal with the request. The element <CustomerDetails> corresponds to FIG. 2, element 31. This data is necessary for the Service Provider to fulfil this specific service request.

Listing 2 - Request From Business Service Broker to Service Provider A.

```
<?xml version="1.0" encoding="UTF-8"?>
<schema targetNamespace="http://www.CBureau.com/CreditCheck"
        xmlns:xml=http://www.w3.org/XML/1998/namespace
        xmlns="http://www.w3.org/2000/10/XMLSchema"
        version="1.0">
<Priority="High">
<Channel="HP">
<SLE="0.625">
<SNO="01AA0006252002">
<Auth="2kJk*^kj)44000">
<CustomerDetails>
    <name="Joe Bloggs">
    <Address>
        <address1="15 Oceanview Terrace">
        <address2="Oceania Avenue">
```

Listing 2 - Request From Business Service Broker to Service Provider A.

```
        <address3="Oceanton Place">
        <address4="The Ocean">
        <home phone="111222333444">
        <work phone="444333222111">
    </Address>
    <DateOfBirth="23/04/1967">
    <Occupation="Personal Trainer">
</CustomerDetails>
```

The response data 22 from the service provider contains elements similarly categorized such as the name of the service being requested 32, the service data 33 includes elements relating to this particular service request, and the request data 34 includes data corresponding to the result of this particular service request.

Listing 3 below shows example code that can form response data 22. The entire data set corresponds to FIG. 2, element 22. This is the data corresponding to the response to the service request, and is sent by the provider to the service broker. The element targetNamespace corresponds to FIG. 2, element 32. This is the Name/Identity of the Service Requested, and the element <SNO="01AA0006252002"> corresponds to FIG. 2, element 33. This is necessary for the Service Broker to process the response. The element <CreditCheckReturn> corresponds to FIG. 2, element 34. This data corresponds to the actual service request. This data will likely contain data that directly influences and/or corresponds to the response that will be passed to the original service requestor Listing 3 - Response from Service Provider A to Business Service Broker

```
?xml version="1.0" encoding="UTF-8"?>
<schema targetNamespace="http://www.CBureau.com/CreditCheck"
        xmlns:xml="http://www.w3.org/XML/1998/namespace"
        xmlns="http://www.w3.org/2000/10/XMLSchema"
        version="1.0">
<SNO="01AA0006252002">
<CreditCheckReturn>
    <Rating="5">
    <Lender>
        <LenderName="The Bank of the Ocean">
        <Loans>
            <OpeningDate="03/01/1999">
            <AccountReference="213321232">
            <AdvancedAmount="30000.00">
            <AdvancedCurrency="USD">
            <BalanceDate="03/01/2002">
            <BalanceAmount="15000.00">
            <BalanceCurrency="USD">
            <Term="60 months">
            <Experience="0">
            <EstimatedInstalmentPerMonth="500">
            <EstimatedInstalmentPerYear="3000">
            <InstalmentCurrency="USD">
            <PaymentList>
                <Payment1=0>
                <Payment2=0>
                <Payment3=0>
                <Payment4=1>
                <Payment5=0>
            </PaymentList>
        </Loans>
```

Listing 3 - Response from Service Provider A to Business Service Broker

```
        </Lender>
        <Lender>
            <LenderName="The Bank of the Sea">
            <Loans>
                <OpeningDate="15/11/2000">
                <AccountReference="124332234">
                <AdvancedAmount="4500.00">
                <AdvancedCurrency="USD">
                <BalanceDate="03/02/2002">
                <BalanceAmount="1000.00">
                <BalanceCurrency="USD">
                <Term="15 months">
                <Experience="0">
                <EstimatedInstalmentPerMonth="300.00">
                <EstimatedInstalmentPerYear="3600.00">
                <InstalmentCurrency="USD">
                <PaymentList>
                    <Payment1=0>
                    <Payment2=0>
                </PaymentList>
            </Loans>
        </Lender>
</CreditCheckReturn>
```

The response data 20 to the service request includes elements similarly categorized such as the name of the service being requested 26, the service data 27 consisting of elements relating to this particular service request, and the request data 28 consisting of data corresponding to the result of this particular service request.

Listing 4 below illustrates response data sent to the requestor. The entire data set corresponds to FIG. 2, element 20. This data set corresponds to response to the service request. The element <BSBRequestInformation> corresponds to FIG. 2, element 27.

This data corresponds to the administration and processing of this service request. This typically contains a serial number to enable the request and the response to be correlated. The element <CreditCheckReturn> corresponds to FIG. 2, element 28. This is the payload of the service request, and contains the response to the initial service request in a format that the requester is expecting.

Listing 4 - Response from Business Service Broker to Requestor

```
<?xml version="1.0" encoding="UTF-8"?>
<schema targetNamespace="http://www.Westglobal.com/CreditCheck"
        xmlns:xml=http://www.w3.org/XML/1998/namespace
        xmlns="http://www.w3.org/2000/10/XMLSchema"
        version="1.0">
```

Listing 4 - Response from Business Service Broker to Requestor

```
<BSBRequestInformation>
    <RequestID="000911288211">
    <RequestedService="CreditCheck">
</BSBRequestInformation>
<CreditCheckReturn>
    <Rating="5">
    <Lender>
        <LenderName="The Bank of the Ocean">
        <Loans>
            <OpeningDate="03/01/1999">
            <AdvancedAmount="30000.00">
            <AdvancedCurrency="USD">
            <BalanceDate="03/01/2002">
            <BalanceAmount="15000.00">
            <EstimatedInstalmentPerYear="3000">
        </Loans>
    </Lender>
    <Lender>
        <LenderName="The Bank of the Sea">
        <Loans>
            <OpeningDate="03/01/2000">
            <AdvancedAmount="4500.00">
            <AdvancedCurrency="USD">
            <BalanceDate="03/02/2002">
            <BalanceAmount="1000.00">
            <EstimatedInstalmentPerYear="3600.00">
        </Loans>
    </Lender>
</CreditCheckReturn>
```

Listing 5 below shows an alternative example to illustrate the Service Broker's ability to route a service request according to the requested result is shown below. The end result may be data, but associated conditions such as performance, service level agreements, prioritisation, unavailability of certain providers, etc, that the client software is unaware of may result in the service broker deciding that service provider B is a better choice for this request than Service Provider A.

In Listing 5, the entire data set corresponds to FIG. 2, element 21. This is the data corresponding to the service request sent by the service broker to the service provider. The element targetNamespace corresponds to FIG. 2, element 29. This is the name/identity of the service requested. The elements <ID="WGBSB1.2"> <Sec="MyPass"> correspond to FIG. 2, element 30. This is the service-provider-specific data that tells the service provider about how to deal with the request. The element <CustomerPSN="213432423432"> corresponds to FIG. 2, element 34. This data corresponds to the actual service request. This item will typically contain data that directly influence and/or correspond to the response that will be passed to the original service requestor.

Listing 5 - Data From Business Service Broker to Service Provider B.

```
<?xml version="1.0" encoding="UTF-8"?>
    <schema targetNamespace="http://www.EAIQuickCheck.com/QuickCheck"
    xmlns:xml=http://www.w3.org/XML/1998/namespace
    xmlns="http://www.w3.org/2000/10/XMLSchema"
    version="1.0">
<ID="WGBSB1.2">
<Sec="MyPass">
<CustomerPSN="213432423432">
```

As will be apparent, different service providers can interact in a different way with the service broker, and return different information. So long as the service being provided corresponds with the response that the original requestor requires, then the broker has the ability to retrieve the response, providing the requestor with a single interface and removing the requirement of any knowledge (hostname, service name, database, table, field, etc) of the service provider from the client.

In Listing 6, the entire data set corresponds to FIG. 2, element 22. This is the data corresponding to the response to the service request, and is sent by the service provider to the service broker. Note that in this example, element 33 of FIG. 2 is absent from the provider packet. This information is provided by the context of the connection, in that it is a synchronous connection, and no additional data is required by the service broker. The element targetNamespace corresponds to FIG. 2, element 32. This is the name/identity of the service requested. The element <QuickCheckReturn> corresponds to FIG. 2, element 34. This data corresponds to the actual service request. This data element contains data that directly influence and/or correspond to the response that will be passed to the original service requestor.

network 10 the response to the service request in the form of packets of data 22 from the service provider 13 to the service broker 12.

Figure 3:
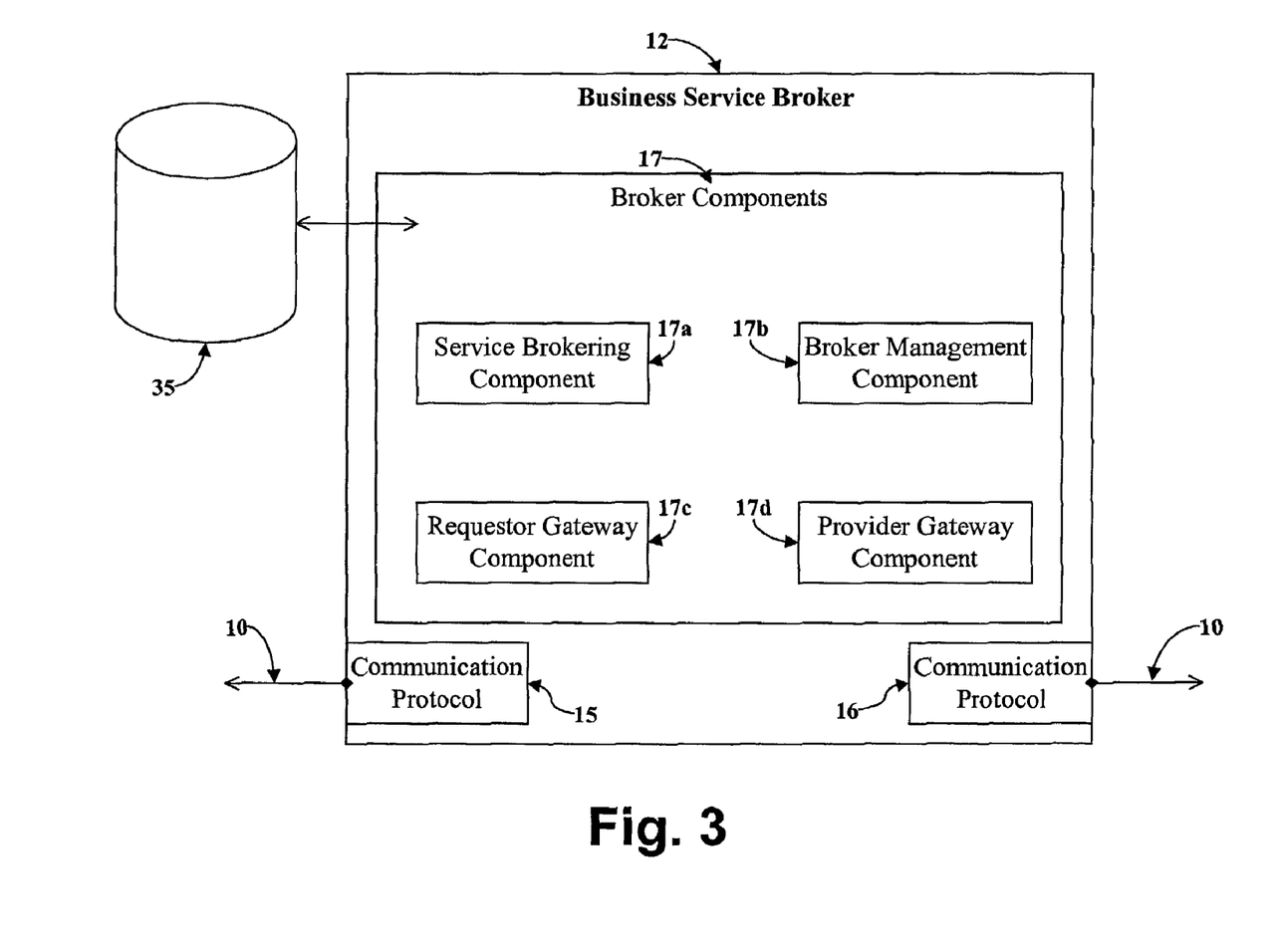
FIG. 3 is a schematic illustration of the preferred embodiment of the business service broker of FIG. 1 and FIG. 2.

Referring to FIG. 3, a data store 35 containing service descriptions and repository may either exist internally within the service abstraction layer, or externally, and identifies the providers and the information that they can provide. The data store contains details that help to ensure the correct delivery of services from a service provider to the service requestor. The data store 35 may also contain information relating to individual requestors, business services, and service providers that may result in modification to the delivery of the services from a service provider to the service requestor. The data store 35 may also contain rules regarding the delivery of business services under different conditions, for example (but not limited to) different times of day, different costs depending on response time, and different costs depending on the service being delivered. The data store 35 may also contain information relating to each request that has been processed by the broker, for example (but not limited to) date, time of day, identity of service, identity of requestor, identity of provider that provided the service, response time, and cost. This data can be stored in many formats using many different technologies, including, for example, ORACLE, UDDI to name but two, under many different configurations.

Listing 6 - Response from Service Provider B to the service broker

```
<?xml version="1.0" encoding="UTF-8"?>
<schema targetNamespace="http://www.EAIQuickCheck.com/QuickCheck"
        xmlns:xml=http://www.w3.org/XML/1998/namespace
        xmlns="http://www.w3.org/2000/10/XMLSchema"
        version="1.0">
<QuickCheckReturn>
    <Lender>
        <LenderName="The Bank of the Ocean">
        <LoanDetails>
            <StartDate="03/01/1999">
            <AdvancedAmount="30000.00">
            <Currency="USD">
            <BalanceDate="03/01/2002">
            <BalanceAmount="15000.00">
            <Experience="0">
            <AnnualInstalment="3000">
        </LoanDetails>
    </Lender>
    <Lender>
        <LenderName="The Bank of the Sea">
        <LoanDetails>
            <StartDate="15/11/2000">
            <AdvancedAmount="4500.00">
            <Currency="USD">
            <BalanceDate="03/02/2002">
            <BalanceAmount="1000.00">
            <Experience="0">
            <AnnualInstalment="3600">
        </LoanDetails>
    </Lender>
    <Rating="5">
</QuickCheckReturn>
```

The service provider 13 may be an application or component being executed on any type of device. The service provider 13 accepts a request from a component within the service abstraction layer that is participating in the fulfillment of a service request. The service provider includes one or more components 18 that fulfil the service request and sends the response, if any, to the service broker using a specific communication protocol 16. This communication may be formatted and delivered according to protocols such as SOAP, IIOP, or RMI for example. The protocol delivers over a physical The data contained in the data store 35 provides the broker with the information that it needs to determine how the request can be fulfilled by the providers. This information need not be provided by (and, indeed, may not be available to) the requester.

The service broker components 17 are necessary to abstract the management of the services from the underlying technologies used to create and deliver the services. Information regarding the business service is stored in the data store 35 and this information is used to optimally deliver the service in an optimal way according to stored pre-set business priorities. A requestor gateway component 17c extracts all relevant information from the requester packet 19 delivered over the specific communication protocol 15 used to transmit the package from the service requestor 11 to the service broker 12. Similarly, the requester gateway component 17c constructs the broker packet 20 for transmission to the service requestor 11. A provider gateway component 17d performs the same function for composing and assembling the broker packet 21 and the provider packet 22 to communicate with the service provider 13.

A service brokering component 17a performs the intelligent execution of the service request. Having identified the service requestor 11 and the name/identity of the service requested 23, the relevant data regarding the optimal delivery of the service is extracted from the data store 35. By using a variety of pre-set rules, a service provider 13 that is available and enabled to provide the requested service is selected, and the request is assembled and transmitted to the selected provider via the provider gateway component 17d. Information regarding the request, including performance data, response times, costs, selected provider, priority, and requestor identity is written to a log and stored in the data store 35.

A broker management component 17b is included to provide the relevant and proper management capabilities of a distributed system of this nature. This component enables a system administrator, or other relevant person, to configure, start, stop, enable, disable, deploy, and un-deploy any component within the system. Typically, and according to best practice, these individual functions may have a security feature, such as password protection or otherwise, to limit access to these functions. The broker management component 17d also provides an interface to add, view, and delete data regarding all aspects of service requestors 11, service providers 13, services delivered by the service broker 12, and business rules, priorities, routes, logs, and performance data regarding the operation of the system. This data can take many forms, and include or exclude many individual elements, and be stored in many formats using many different technologies (such as ORACLE, UDDI) under many different configurations.

Figure 4:
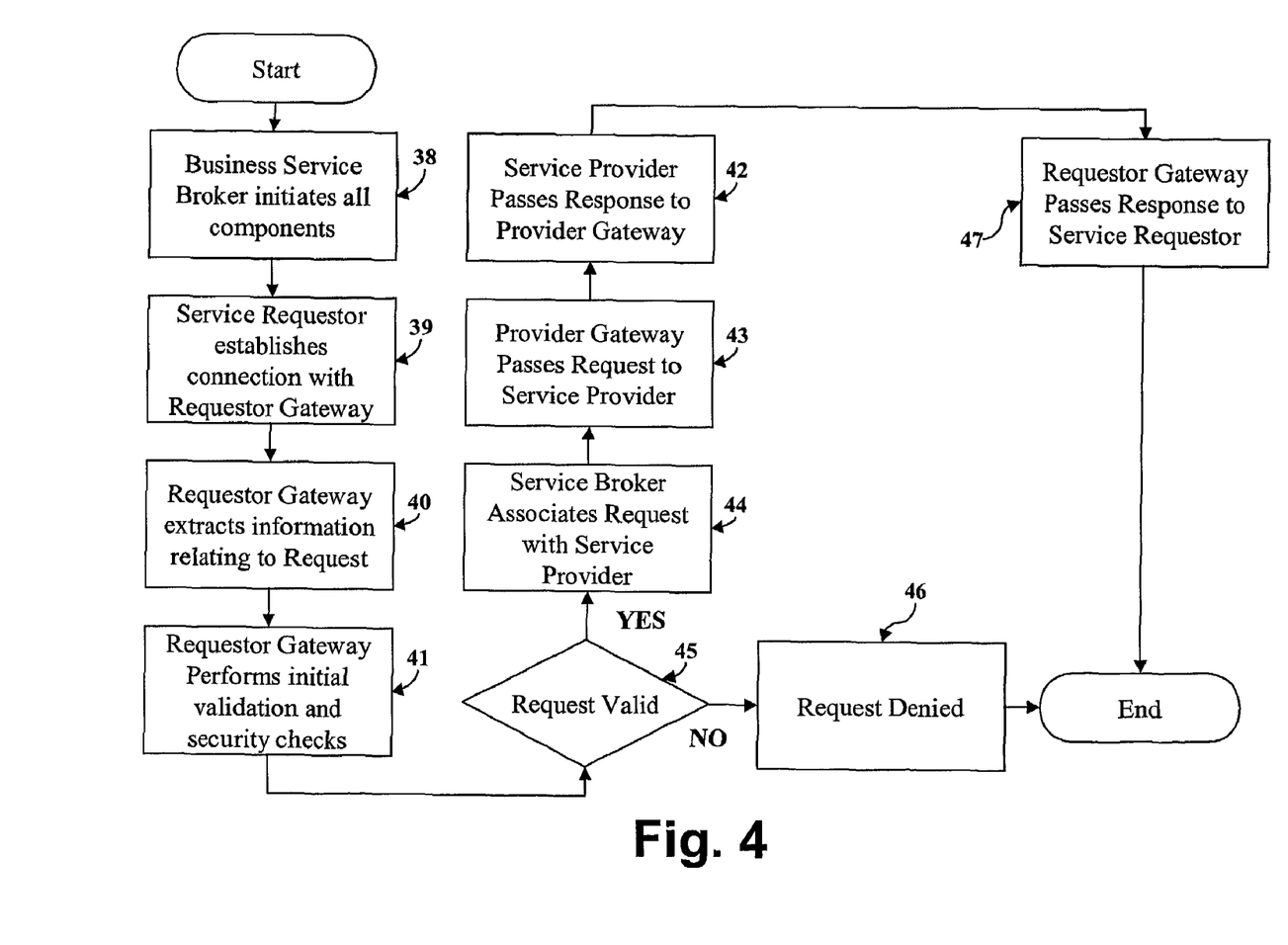
FIG. 4 is a schematic illustration of a preferred process made according to the present invention for brokering business services between the service provider and the service requester.

With reference to FIG. 4 and in accordance with the principles of embodiments of the invention, the service request processing will now be described.

Step 38 represents system initiation. The service broker 12 is initiated either automatically by the host computer upon which it is executed, or manually by a system administrator or other relevant person. The broker management component 36 initiates each component in the system according to stored configuration information until the entire system is ready. The purpose of this step is to properly initiate and manage the entire system.

At Step 39, a service requestor 11 communicates with the service broker 12 to make a request for a service. This step involves the requestor packet 19 being transmitted over the physical network 10 using a communication protocol 15 from the service requestor 11 to the service broker 12. The purpose of this step is for the service broker 12 to properly receive a service request from the service requestor 11.

Step 40 refers to the transmitted requester packet 19 being processed by the requestor gateway component 35 in order to extract details that will effect how the request is processed by the system. These details will include the name/identity of the service requested 23 and the request data 25 which includes the identity of the service requestor 11 and authorization data.

The purpose of this step is to perform initial processing of the structure of the transmitted data, and to extract all relevant data for further processing.

Step 41 refers to examination of the service request received, and to perform initial validation and security authorization checks. The requestor gateway component 35 performs these checks, and these checks may include the following:

1. Does the service requestor identity correspond with a stored identity?
2. Does the authorization data pass the security check?
3. Does the service that is being requested correspond with a stored business service?
4. Does this service requestor have authorization to request this business service?
5. Is this service available under the terms of the request?
6. Is there enough data in the service request to properly process the request?
7. Is it a valid request?

If the request is valid, a unique request number or identity is associated with the request, and this unique identity is used to track the request and to refer to the request throughout the system. The purpose of this step is to validate the request as early as possible in the request lifecycle before passing it on for further processing.

Step 45 refers to the decision point on whether or not the request passed initial validation and security checks. If the request was not validated, or failed the security check, it passes to step 46. If the request passed, processing continues with step 44.

At Step 46, a request that failed initial validation and security checks is handled. In effect, the request is prevented from being processed further. A notification may be returned to the service requester 11 to inform it of the request being denied.

Step 44 refers to the request being processed by the brokering component 17a in order to:

1. Record information about the request.
2. Process the request according to rules stored in the data store 35.
3. Assign a cost to the request.
4. Select a service provider 13 to process the request.
5. Pass the request to the relevant provider gateway component 37.

The purpose of this step is to optimise the processing of the request. This enables the processing of each request to be tailored in response to many factors, including but not limited to: the identity of the service requester 11, the current real-time response times of the available service providers 13, the priority assigned to the request or to the service requestor 11, the cost assigned to the request, the revenue that the request may generate, the time of day, the day of week, the available service providers 13, and the maximum response time indicated within the request. Many factors can be incorporated to affect the processing and delivery of a service request, the aim being to optimise the processing in accordance with preferred criteria.

A particular part of the processing carried out at this stage is determining which of a known set of service providers can respond to the request. This means that the requester 11 need not know the identity of the provider 13 or providers that must be contacted in order to handle the request. Now, in the event that the configuration of a provider is changed, this need have no direct impact upon the requester. Instead, all that is required is reconfiguration of data within the data store 35 to reflect the new provider configuration.

Many factors can influence the decision of the broker as to which specific providers will provider the response to the service request, such as:

- the priority given by the broker to the individual requestor, as set up by the system administrator;
- the current performance of the providers that can provider the service;
- the existence or otherwise of a service level agreement between the provider and the requestor;
- the current availability of the service from particular providers.

Step 43 refers to transmitting the request to the service provider 13 that was selected by the service-brokering component 34 to handle the request. The provider gateway component 37 assembles the broker packet 21 that contains the service request and transmits this packet to the service provider 13 using a communication protocol 16. The purpose of this step is to transmit the request to the service provider 13.

Step 42 refers to processing of the service request response transmitted by the service provider 13 after processing the service request. The provider packet 22 is transmitted from the service provider 13 to the provider gateway component 37 using the communication protocol 16. The data is examined and the response is associated with an earlier request by using the unique request number. The service-brokering component 34 passes the request to the request gateway component to assemble the broker packet 20 for transmission to the service requestor 11. The purpose of this step is to process the response and prepare the broker packet 20 containing the response for transmission to the service requestor 11.

Step 47 refers to the transmission of the broker packet 20 from the business service broker 12 to the service requestor 11. The requester gateway component 35 assembles the broker packet 20 and transmits the data using the requester-side communication protocol 15 to the service requester 11. The purpose of this step is to pass the response to the service request from the service provider 13 to the service requester 11.

A typical interchange between a requester and the broker might proceed as follows:

1. The requestor transmits a service request encoded in packets to the broker. The packet structure may be complex, with a structure such as: <Requestor ID><Security and Authentication Information><Date><Time><Service Level Excepction> <Service Identity> <Input parameters for Service> or simple, such as <Input Parameters for Service>, and the broker may extrapolate from the connection method and gateway all necessary information.
2. The broker processes the packet to validate and authenticate it.
3. The broker selects a provider.
4. The broker assembles request for provider (as defined in configuration database, which may use definitions described using IDL or WSDL or any other suitable description language such as CORBA IDL or Java RI) and transmits packets using the appropriate protocol and data formats of the chosen provider.
5. The broker accepts a response from chosen provider.
6. The broker interprets the response (as defined in configuration database as above) and assembles response for requestor.
7. The broker transmits response.

It should be understood that the requesters must be configured using a particular language of the broker, however this does not mean the requesters must be tailored for use with the broker. The broker "mimics" or "proxies" real end points representing services, and the real end points are typically described using a description language such as IDL or WSDL. The broker end points are not true end points, as the broker does not actually perform any of the service workload. The real end points may use any number of different technologies. The broker adapts to these, and then exposes the broker end point for the service. Now, the requestors must somehow access the service. If the requestor has already accessed the original provider end-point directly, then the broker adapts whatever is in place already, and this will work without further alteration. Each individual broker end-point will typically be described in a description language such as IDL and WSDL as well as other more proprietary formats, depending on the technologies in use by the requestor. The requestor communicates with the broker as it did with the end-point direct, and the requestor receives the same responses as if the requestor is still in direct communication with the original end-point, even though the communication is directed to the broker.

In many situations, whatever is in place may not be the ideal solution, especially from a flexibility or security point of view, and for this reason, a decision may be taken to make changes in the way the requestor communicates when the broker is introduced. A new requestor may wish to access the existing service, but chose a different communication method or protocol. These decisions do not directly affect the architecture or design of the broker, and so the requestors are being tailored to suit themselves.

A service requestor can act as a service provider and such a service requestor can incorporate functional activities similar to that of the service provider. Likewise, a service provider may act as a service requestor and the service provider may incorporate functionality activities similar to that of the service requestor. In understanding this, embodiments of the invention can be thought of as operating not in terms of client-server computing, but more in terms of peer to peer, whereby participating components can be either requestors or providers. Whether any one peer is a requester or a provider may be a matter of whether it has any services that it can offer for brokering. The claim is stating the role of requestor doesn't exclude the component from also taking on the role of a provider.

The embodiments described herein are not intended to be exhaustive or to limit the invention to the precise forms disclosed. Rather it is to be understood that the invention is capable of use in various other components, combinations and environments. The developing nature of IT is such that embodiments of the invention will emerge in future that make use of technology that is not presently available. Such technologies may be used in construction of embodiments of the invention.

We claim:

1. A service request broking system operative between independent first computer system and second computer system to receive a service request for a service from a computer application requester and to transmit the service request to a computer application provider, comprising:
    (a) a requester-side processing stage operative to communicate with the computer application requester operative in a first computer system;
    (b) a provider-side processing stage operative to communicate with a computer application provider operative in a second computer system, the computer application provider having a computer address and a physical and logical interface or structure; and (c) a broking stage independent of the computer application requester and of the computer application provider operative in a third computer system to receive the service request from the computer application requester, the service request identifies the service that is required by the computer application requester and does not contain an identification of the computer application provider to fulfil the service request, the service request expressed in terms that are independent of the computer address and the physical and logical interface or structure of the computer application provider, wherein upon receipt of the service request from the computer application requester, the broking stage is further operative to identify the computer application provider to fulfil the service request and to send the service request to the computer application provider through the provider-side processing stage.

2. The service request broking system according to claim 1 in which the broking stage is further operative to obtain data required to respond to the computer application requester by communicating with the computer application provider through the provider-side processing stage.

3. The service request broking system according to claim 1 in which the broking stage is operative to formulate and return a response to the computer application requester through the requester-side processing stage.

4. The service request broking system according to claim 1 in which the requester-side processing stage communicates with the computer application requester using a requester-side protocol.

5. The service request braking system according to claim 4 in which the service request is delivered to the broking system over a computer network.

6. The service request broking system according to claim 5 in which the service request is transmitted in accordance with a protocol including one or more of SOAP, IIOP and RMI.

7. The service request broking system according to claim 5 in which the response to the service request is transmitted in accordance with a protocol including one or more of SOAP, IIOP and RMI.

8. The service request broking system according to claim 1 in which the provider-side processing stage communicates with the computer application provider using a provider-side protocol.

9. The service request broking system according to claim 1 in which the requester-side processing stage communicates with the computer application requester using a requester-side protocol and the provider-side processing stage communicates with the computer application provider using a provider-side protocol, the requester-side protocol and the provider-side protocol being dissimilar.

10. The service request broking system according to claim 1 further comprising a data store that contains information about one or more computer application providers in which the broking stage is operative to make reference to the data store to determine parameters for selecting one of the computer application providers to which the broking stage sends the service request for fulfillment.

11. The service request broking system according to claim 10 in which the data store contains data that identifies which one of the plurality of computer application providers can respond to the service request.

12. The service request broking system according to claim 10 in which the data store contains data that relates to a plurality of computer application requestors and at least one service that the computer application requesters can request.

13. The service request broking system according to claim 10 in which the data store contains data relating to conditions that affect provision of services.

14. The service request broking system according to claim 13 in which validation includes verification that the computer application requester is entitled to make the service request.

15. The apparatus according to claim 10, wherein the data store contains one or more of:
a) data that identifies which computer application provider (can fulfil the service request;
b) data that relates to individual computer application requester and the services that the computer application requester can access; and
c) data relating to conditions that affect provision of the service request.

16. The service request broking system according to claim 1 in which the broking stage is operative to validate the service request prior to transmitting the request to the computer application provider.

17. The service request broking system according to claim 16 in which validation includes verification that the request is validly formulated for the requester-side processing stage.

18. The service request broking system according to claim 17 in which the service request is encrypted.

19. The service request broking system according to claim 1 in which available computer application provider interfaces and capabilities are defined using a description language.

20. The service request braking system according to claim 19 in which the description language is IDL or WSDL.

21. A method operative between independent computer systems of routing service requests between a plurality of computer application requesters each with a need for a service and a plurality of computer application providers, comprising the steps of:

(a) sending a service request by a computer application requester to an independent broking system, the service request being made in accordance with a requester-side protocol and a broker interface definition, the service request identifying the service that is required by the computer application requester and does not contain an identification of a computer application provider of the requested service;

(b) the broking system analyzing the service request received by the broking system to identify which one of at least one computer application provider can fulfil the service request, the computer application provider having a computer address and a physical and logical interface or structure, and the service request expressed in terms that are independent of the computer address and the physical and logical interface or structure of the computer application provider; and (c) for the computer application provider, formulating by the broking system a provider request that includes the service request and sending the provider request to the identified computer application provider, the service request being encoded in a provider-side protocol.

22. The method according to claim 21 in which, having sent the service request to the computer application provider, the broking system awaits a response from the computer application provider and upon receipt of the response based on the service request provides the response to the computer application requester.

23. The method according to claim 21 in which the broking system determines which computer application provider can fulfill a response to the service request in dependence upon the service that is being requested, an identity of the computer application requester determined by the broking system, and a plurality of business rules associated with the delivery of the service requested in the service request.

24. The method according to claim 21 in which the requester-side processing stage communicates with the computer application requester using a requester-side protocol and the provider-side processing stage communicates with the computer application provider using a provider-side protocol, the requester-side protocol and the provider-side protocol being dissimilar.

* * * * *